June 13, 1961  C. T. RASMUSSEN ET AL  2,987,837
DITCHERS
Filed July 14, 1958  4 Sheets-Sheet 1
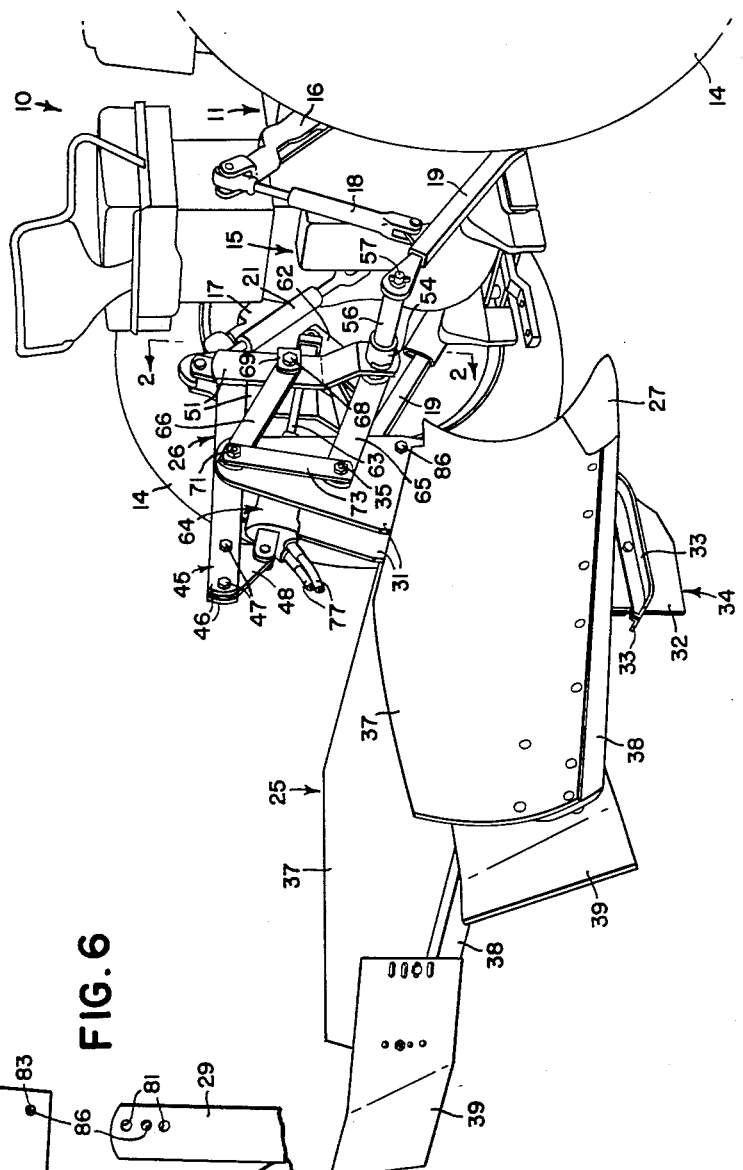
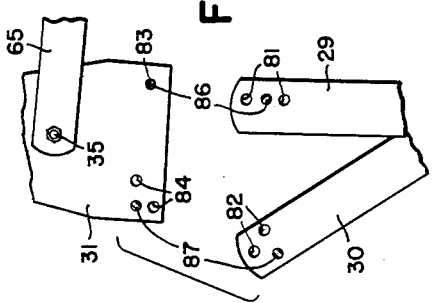
INVENTORS.
C. T. RASMUSSEN
EDWIN F. WADELTON
BY
ATTORNEYS

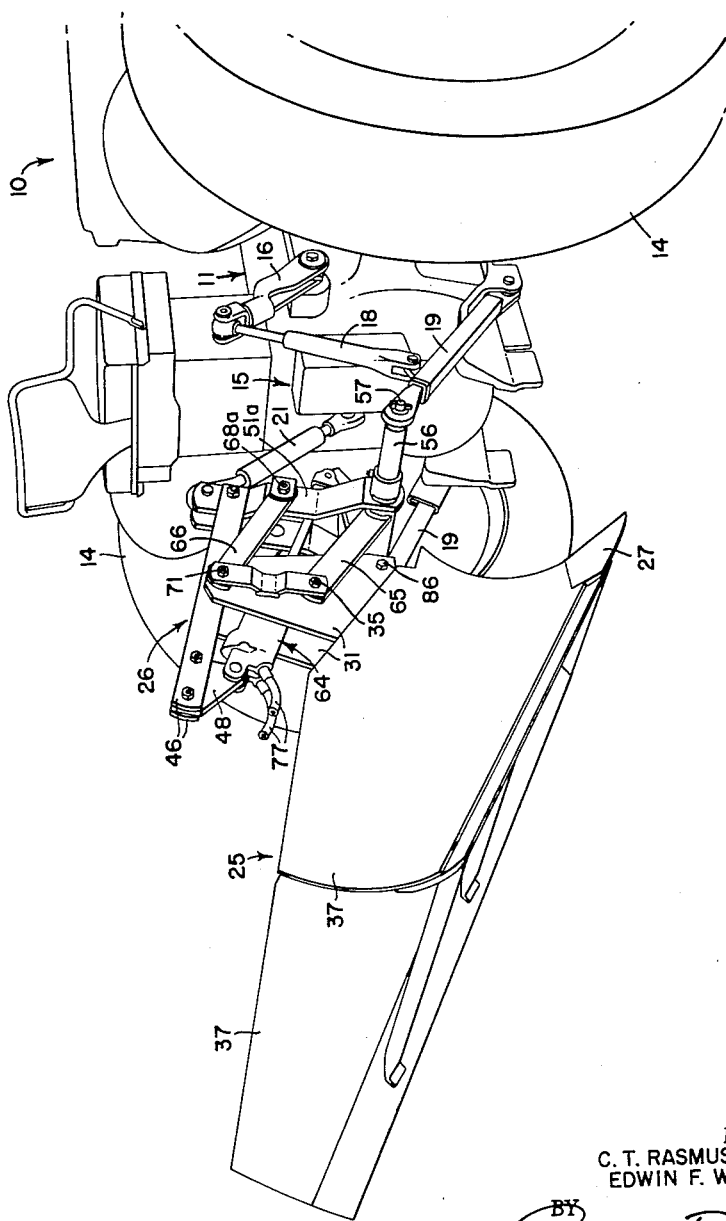

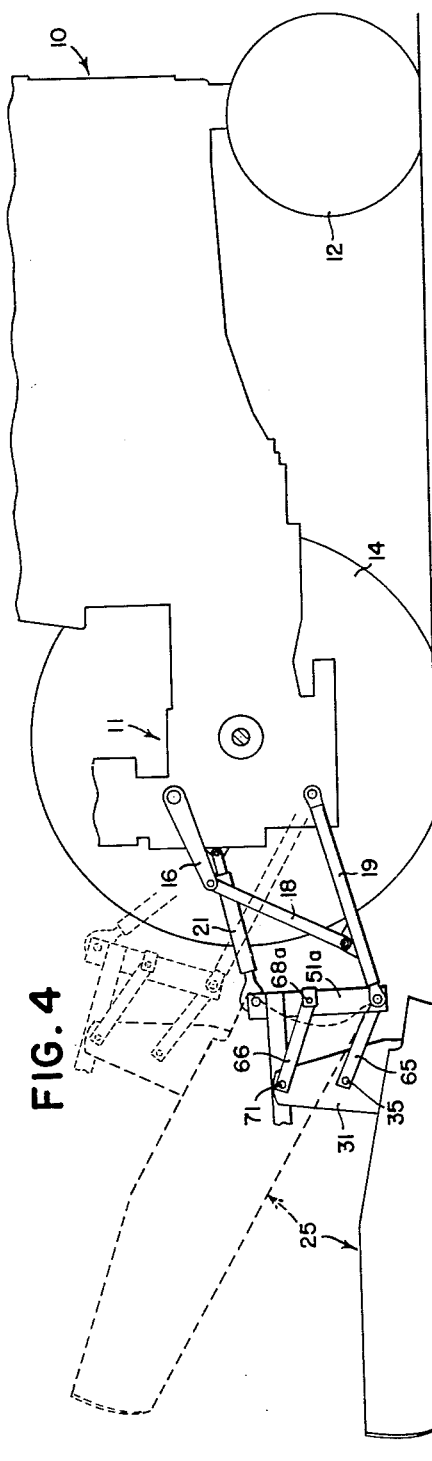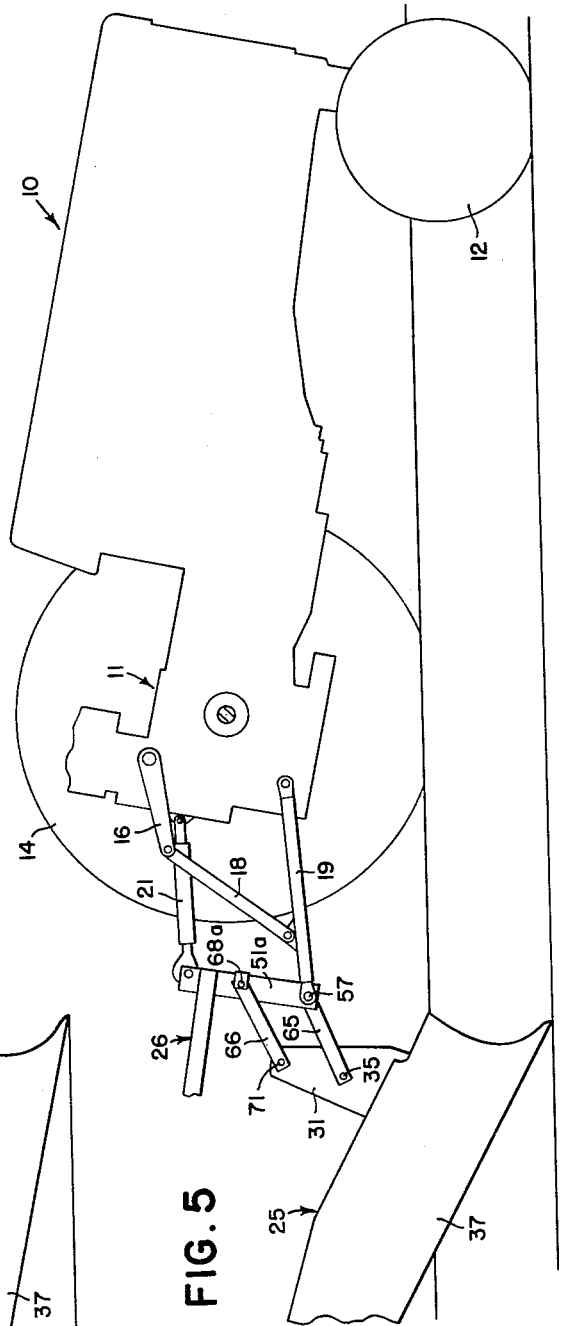

2,987,837
DITCHERS

Clarence T. Rasmussen and Edwin F. Wadelton, Los Angeles, Calif., assignors, by mesne assignments, to Deere & Company, a corporation of Delaware
Filed July 14, 1958, Ser. No. 748,368
9 Claims. (Cl. 37—98)

The present invention relates generally to agricultural implements and more particularly to earth working units adapted to be mounted on and serve generally as a part of the propelling tractor. Such implements are commonly referred to as integral implements, and in operation are drawn by the tractor and in transport are carried substantially wholly on the tractor.

The object and general nature of the present invention is a provision of a ground working machine in the form of a ditching plow of the integral or tractor-carried type. An important feature of this invention is a provision of a tractor-carried integral ditcher that can be raised not only by the raising and lowering hitch mechanism that forms a part of the tractor, but can also be raised and lowered by means of an auxiliary power unit and associated shiftable hitch means. By virtue of this construction, the ditching plow may be shifted from an extremely low position, permitting the ditcher to be used for cleaning out existing ditches, to an elevated position relative to the tractor so as to provide for adequate ground clearance during transport.

More specifically, it is a feature of this invention to provide a ditcher with auxiliary power operated hitch means so constructed and arranged so that the ditcher is particularly adapted to be used with tricycle type tractors, a type of tractor which has widely spaced apart rear wheels and centrally located front wheel means, in which, when cleaning out ditches, the front wheel means of the tractor runs along the bottom of the ditch to be cleaned while the rear wheels run on the opposite banks of the ditch. According to this invention, the hitch arrangement is particularly adapted to permit the ditching plow to be brought into proper operative position at the desired or necessary angle with respect to horizontal, even though the front end of the tractor may be tilted downwardly to an appreciable degree when used in cleaning out old ditches.

A further and more specific feature of this invention is a provision of an integral ditcher that has means in the form of non-parallel links connecting the ditching plow unit with the hitch frame that is carried on the tractor by the usual power lift actuated links, said non-parallel links being arranged so that they converge rearwardly, with the result that the ditching plow may be adjusted generally vertically relative to the hitch frame about a virtual pivot that lies well to the rear and generally above the tractor-carried hitch frame. It is also a feature of this invention to provide a ditching plow hitch structure constructed and arranged with non-parallel links that converge forwardly, rather than rearwardly, with the result that the plow is disposed in the proper position relative to the ground for initially starting the formation of a ditch in level ground. Also, with this non-parallel forward convergence of the links, the ditching plow may be disposed in a normal attitude with respect to the ground line and operated with the front centrally disposed wheel means of the tractor passing along in the ditch formed at the first pass across the field.

These and other objects and advantages of the present invention will be apparent to those skilled in the art after a consideration of the following detailed description, taken in conjunction with the accompanying drawings, in which:

FIG. 1 is a perspective view of a tractor mounted ditcher incorporating the principles of the present invention.

FIG. 3 is a perspective view of a slightly modified form of the present invention, in which the non-parallel hitch links are arranged to converge rearwardly, whereas the corresponding non-parallel links as shown in FIG. 1 converge forwardly.

FIG. 4 is a side view, largely diagrammatic in character, illustrating the action of the non-parallel links and associated parts when the outfit shown in FIG. 3 is operated to open up a ditch, making a first pass across the field.

FIG. 5 is a view similar to FIG. 4, showing the relative positions of the ditcher and tractor when cleaning out an existing ditch.

FIG. 6 is a fragmentary detail view showing the attachment of the ditcher bottom to its associated supporting structure.

Figure 2:
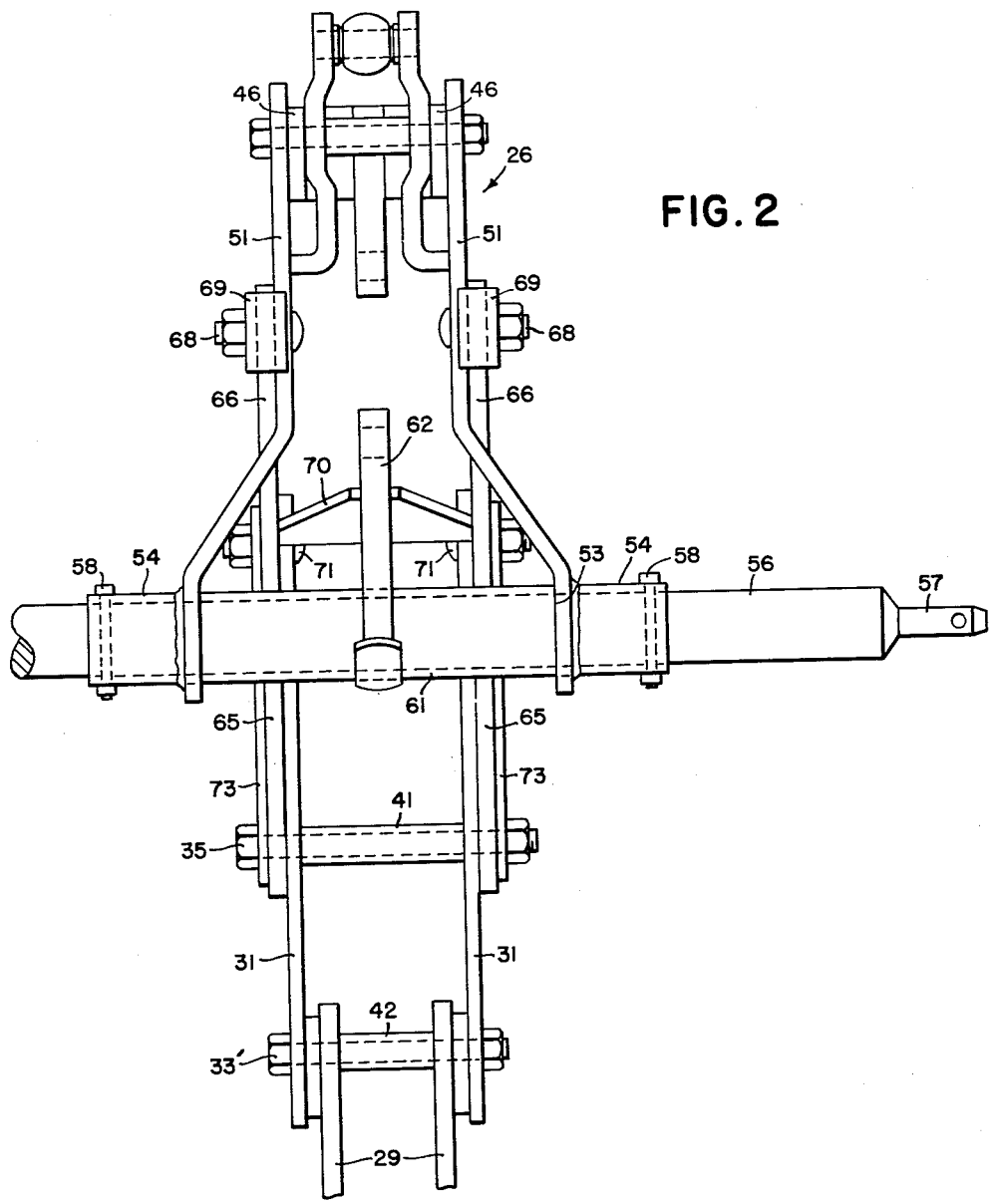
FIG. 2 is an enlarged detail view being taken generally along the line 2—2 of FIG. 1.

Referring first to FIG. 1, the implement of the present invention is shown as adapted for attachment to a tractor 10 of the tricycle type that employs a frame and transmission housing structure 11 supported at the front end on a centrally disposed front wheel means 12 (FIG. 4) and rear laterally spaced apart drive wheels 14. The tractor has conventional power lift mechanism indicated in its entirety by the reference numeral 15 and including right and left hand power actuated lift arms 16 and 17 connected through lift links 18 with a pair of lower laterally spaced apart generally rearwardly extending draft links 19. The tractor also includes an upper rearwardly extending compression link 21, also conventional so far as the present invention is concerned.

The ditching plow is indicated in its entirety by the reference numeral 25 and is provided with or attached to suitable hitch frame means 26 by which the plow is connected with the rear end of the upper and lower tractor links 21 and 19. The ditching plow is per se generally conventional, employing a front point in the form of a ground entering share 27 connected in any suitable way to a bottom support that includes a pair of generally vertical standard bars 29 and a pair of associated braces 30 (FIG. 6) that at their upper ends are adjustably connected to a pair of vertically extending bracket plates 31. The adjustability of these parts will be described in detail later. Secured in any suitable way to the lower ends of the standard bars 29 is a ditcher guide 34 that includes a vertical fin 32 and a pair of attaching angles 33 that are connected in any suitable way to the lower end of the bars 29. The upper ends of the latter are connected by suitable bolt means 33' to the lower portions of the brackets 31.

A pair of wings or moldboards 37 extend rearwardly in diverging relation as best shown in FIG. 1, and are secured in any suitable way to the lower portions of the bars 29 and the bracket plates 31. The moldboards 37 include reversible cutting bars 38 and, at the rear ends, moldboard extensions 39. The two bracket plates 31 are held in laterally spaced apart relation by upper and lower bushings 41 and 42, the bushing 42 being disposed on the bolt 33' and the bushing 41 being disposed on the bolt 35 that serves as lower pivot means which will be referred to later.

The hitch frame structure 26 comprises a fore-and-aft extending frame bar 45 that is made up of a pair of strap members 46 suitably interconnected at their rear end, as by bolt means 47 that holds a cylinder-receiving bracket 48 in place. The front ends of the strap members 46 are secured, as by welding, to the vertical hitch frame bars 51 that form the principal portion of a vertical mast structure to which the rearward ends of the upper and lower link means 19 and 21 are connected. The lower ends of the vertical bars 51 flare outwardly and downwardly and are apertured, as at 53, to receive transverse sleeve members 54, there being one sleeve section 54 at the lower end of each of the bars 51. Each sleeve section 54 is secured, as by welding, to the associated vertical bar 51. A cross bar 56 is rockably disposed within the sleeve sections 54 and at its ends carries means, such as a connector 57 or the like, to receive the rear ends of the associated lower draft links 19. Each sleeve section 54 is secured, as by pin or bolt 58, to the associated cross bar 56.

Disposed between the lower ends of the vertical hitch frame bars 51 and rockably mounted on the central portion of the cross bar 56 is a transverse sleeve 61. An arm 62 is welded or otherwise rigidly fixed to the central portion of the sleeve 61 and receives the piston rod 63 of the hydraulic ram unit 64, the other end of which is pivotally connected to the bracket 48, as best shown in FIG. 1. Extension and retraction of the cylinder unit 64 thus swings the arm 62 and associated sleeve 61 about a generally transverse horizontal axis. Secured to the end portions of the central sleeve 61 is a pair of links 65, the rear end portions of which are disposed at the laterally outer sides of the bracket plates 31. The rear ends of the links or arms 65 are swingably mounted on the bolt means 35, thus being pivotally connected with the ditching plow unit. The vertical brackets 31 are disposed on opposite sides of the hydraulic ram unit 64, as best shown in FIG. 1. The upper portions of the bracket plates 31 are connected by upper links 66 with the hitch frame bars 51, the links 66 being apertured at their front ends to receive pivot bolts 68, that extend through the suitable apertures formed in the bars 51. The links 65 and 66 are shown in their upper position in FIG. 1 and in a lower position in FIG. 2. Clips 69 are welded to the apertured portions of the bars 51 and are apertured in alinement with the apertures receiving the pivots 68, the clips 69 reenforcing and strengthening the pivots 68. The links 65 are directly connected with the arm 62 by a reenforcing plate 70. The rear ends of the links 66 are connected with the upper portions of the bracket plates 31 by pivot means 71, and vertical straps 73 extend between the pivots 35 and 71 for strengthening and reenforcing the latter.

As mentioned above, in the form of the invention shown in FIG. 1 the upper and lower links 65 and 66 are arranged to converge forwardly whereby, in effect, the ditching plow unit 25 is connected with the hitch frame 26 for movement about a virtual pivot that is located forwardly and downwardly, generally at a point about where the front wheels contact the ground.

In operation, it will be understood that the hydraulic unit 64 is in the nature of an auxiliary cylinder operatively connected, as by a pair of hose lines 77, with the hydraulic mechanism 15 of the tractor so that the cylinder 64 may be extended or retracted at any time, and thus swing the plow unit upwardly or downwardly relative to the associated hitch frame 26, as desired. This movement is separate from and independent of the raising and lowering of the draft links and hitch frame by the power lift arms 16. When making the first pass across a level field for the purpose of forming an initial ditching cut, the power unit 64 is extended so as to raise the links 65 and 66 which has the effect of tipping the unit 25 generally forwardly so that the plane containing the lower edges of the moldboards 35 extends downwardly and forwardly and the ditcher comes into engagement with the ground at an angle that is not too flat. This is the first pass across the field.

On the second pass, the front wheels of the tractor will be driven along the bottom of the initially formed ditch while the rear wheels pass along the surface of the ground. The tractor itself is thus tilted downwardly toward the front. To counteract this, the draft links 19 are lowered slightly to permit the plow to make a second cut and the power cylinder 64 is retracted, thus swinging the rear ends of the links 65 and 66 downwardly, which has the effect of raising the nose of the ditcher relative to the rear of the ditcher and disposing the moldboard blades in a somewhat flattened position. This has the effect of compensating for the fact that during the second pass, and subsequent passes, the front wheels of the tractor move along the bottom of the ditch and the tractor itself is tilted. Thus, for the second and subsequent passes, the tractor occupies increasingly angled or forwardly tilted positions due to the front wheel means running in the bottom of the ditch, but this is accommodated by lowering the links 65 and 66 and lowering the hitch links 19 and 21 when necessary.

The form of the invention shown in FIGS. 3 et seq. is substantially like that shown above except that, as shown in FIG. 3, the hitch frame bars indicated at 51a are so constructed so as to provide for a higher disposition of the pivot at the front end of the upper non-parallel links 66. In FIG. 3, the distance between the upper pivots, indicated at 68a, and the axis of the cross bar 56 is greater than the distance between the rear pivots 35 and 71. As a result of this construction, the links 65 and 66 converge rearwardly so that the ditcher unit 25, in effect, swings about a virtual pivot located generally at the convergence of the links 65 and 66, above and rearwardly of the front end of the plow 25 as well as rearwardly and above the hitch frame 26.

As illustrated in FIG. 5, the arrangement of the non-parallel links 65 and 66 in rearwardly converging relation results in important advantages when performing reditching operations. That is, cleaning out and/or deepening or widening existing ditches. For example, when performing operations of this nature, the front wheel means of the tractor pass along the bottom of the ditch, and since the latter is already fairly deep, the tractor is tilted downwardly to an appreciably greater degree than when operated in original ditching operation as illustrated in FIG. 4. Thus, when the draft links 19 are raised, as for transport purposes and the ditcher 25 raised further by raising the links 65 and 66, the ditching plow 25, moving about a rear and upwardly disposed virtual pivot, swings generally upwardly and forwardly, the front point of the plow when raised also being moved inwardly toward the tractor as compared to its position when the links 65 and 66 are lowered. This has the important advantage of improving transport clearance, because not only is the plow point raised, but it is also brought somewhat closer in behind the rear wheels of the tractor. Then, when lowered for ditching or reditching operations, lowering being accomplished by lowering the draft links 19, the ditching plow is at the correct angle relative to the horizontal to perform the ditching action effectively.

When forming a ditch in level land with the arrangement shown in FIG. 4, the ditcher can be lowered for a second pass by lowering the links 65 and 66 and this results in tipping the nose of the ditching plow downwardly and forwardly at a fairly sharp angle so as to make a sharp V ditch with maximum clearance under the cross bar 56. Thus, during the succeeding pass or passes, when the front wheels of the tractor move along the bottom of the partially formed ditch, the ditcher angle can be increased by lowering the links 65 and 66, with further lowering of the cross bar 56 by lowering the draft links 19, where necessary.

The ditcher bottom 25 may be adjusted relative to the associated bracket plates 31 so as to change the angle of the ditcher relative to the brackets 31. To this end as best shown in FIG. 6, the upper ends of both the bars or supports 29 and the braces 30 are provided with a plurality of openings indicated at 81 and 82, respectively. Similarly, the lower portion of the brackets 31 have forward openings 83 and a plurality of rear openings 84.

The bracket openings 83 receive a forward bolt 86 that may be disposed optionally in any selected openings 81 in the bars 29. In FIG. 6 the parts are shown in separated or exploded relation. A rear bottom-attaching bolt 87 is disposable in selected openings 82 and 84. For average soil conditions, the bolts preferably are positioned in the particular openings shown in FIG. 6. If an extreme V-shaped ditch is desired, bolt 86 may be placed in the uppermost holes 81, and if a flatter ditch is desired, the bolt 86 may be placed in the lowermost hole 81.

While we have shown and described above the preferred structure in which the principles of the present invention have been incorporated, it is to be understood that our invention is not to be limited to the particular details, shown and described above, but, in fact, widely different means may be employed in the practice of the broader aspects of our invention.

What we claim, therefore, and desire to secure by Letters Patent is:

1. A ditcher adapted for mounting on a tractor having a power lift including a pair of vertically swingable lower draft links and an upper link, said ditcher comprising a frame attachable to the rear ends of said upper and lower links and including a forward generally vertical section, adapted at its upper portion to receive the rear end of said upper link and at its lower portion to receive the rear ends of said lower links, and a generally rearwardly extending section, a ditching plow, means swingably connecting said plow with the generally vertical section of said frame for movement relative thereto about a virtual pivot located an appreciable distance in a fore-and-aft extending direction from said frame, said swingable connecting means including upper and lower generally rearwardly extending links pivotally connected at their forward ends with said frame section and at their rear ends with said plow, an arm connected with certain of said last mentioned links, and a power cylinder connected between the rear end of said rearwardly extending frame section and said arm for raising and lowering said plow relative to said ditcher frame.

2. A ditcher adapted for mounting on a tractor having a power lift including a pair of vertically swingable lower draft links and an upper link, said ditcher comprising a frame attachable to the rear ends of said links and said frame including a lower cross bar adapted to receive the rear ends of said lower draft links, a pair of laterally spaced apart generally vertically disposed bars rigidly connected at their lower ends to said cross bar and having means at their upper ends to receive the rear end of said upper link, and a rearwardly extending upper frame bar fixed to the upper portions of said pair of vertical bars, a pair of generally rearwardly extending and vertically spaced apart links pivotally connected with each of said vertical bars, link-swinging arm means connected with certain of said links, a pair of laterally spaced apart bracket plates pivotally receiving the rear ends of both pairs of said rearwardly extending links, a ditching plow carried by said bracket plates, and a hydraulic ram connected with the rear end of said upper frame bar and with said arm means for swinging said pairs of links to raise and lower said ditching plow relative to said frame.

3. The invention set forth in claim 2, further characterized by the links of said pairs being arranged to converge rearwardly.

4. The invention set forth in claim 2, further characterized by the links of said pairs being arranged to diverge rearwardly.

5. A ditcher adapted for mounting on a tractor having a power lift including a pair of vertically swingable lower draft links and an upper link, said ditcher comprising a frame attachable to the rear ends of said links, said frame including a generally vertically disposed bar means and a generally rearwardly extending upper frame bar, a cross bar rotatably mounted in the lower portions of said bar means, a ditching plow having generally upwardly extending bracket means, pairs of upper and lower generally rearwardly extending links pivotally connected at their rear ends with said bracket means, means pivotally connecting the forward ends of the upper links of said pairs of links to said bar means, the lower links being fixedly connected with said cross bar, an arm fixedly connected with said cross bar and a hydraulic ram connected between said arm and the rear end portion of said upper frame bar.

6. A ditcher adapted for mounting on a tractor having a power lift including a pair of vertically swingable lower draft links and an upper link, said ditcher comprising a frame attachable to the rear ends of said links, said frame including a generally vertically disposed bar means and a generally rearwardly extending upper frame bar, a transverse sleeve rotatably mounted in the lower portions of said bar means, a ditching plow having generally upwardly extending bracket means, pairs of upper and lower generally rearwardly extending links pivotally connected at their rear ends with said bracket means, means pivotally connecting the forward ends of the upper links of said pairs of links to said bar means, the lower links being fixedly connected with said sleeve, a cross bar extending through said sleeve and having means at its ends to connect to the rear ends of said lower draft links, an arm fixedly connected with said sleeve, and a hydraulic ram connected between said arm and the rear end portion of said upper frame bar.

7. A ditcher adapted for mounting on a tractor having a power lift including a pair of vertically swingable lower draft links and an upper link, said ditcher comprising a frame attachable to the rear ends of said upper and lower links and including a forward generally vertical section, adapted at its upper portion to receive the rear end of said upper link and at its lower portion to receive the rear ends of said lower links, and a generally rearwardly extending section, a ditching plow having a pair of upwardly extending laterally spaced apart brackets disposed generally at opposite sides of said rearwardly extending frame section, a pair of links connecting each bracket with said generally vertical frame section, and means disposed generally between said brackets and connected between said rearwardly extending section and said ditching plow for raising and lowering the latter relative to said frame.

8. A ditcher as defined in claim 7, further characterized by means connecting said brackets to the ditching plow in different selected positions.

9. A ditcher adapted for mounting on a tractor having a power lift including a pair of vertically swingable lower draft links and an upper link, said ditcher comprising a frame attachable to the rear ends of said upper and lower links, said frame including a lower cross bar connectible at its ends with the rear ends of said lower draft links, a section extending upwardly from said cross bar and adapted to receive the rear end of said upper link, and an upper rear section rigidly connected with the upper portion of said upwardly extending frame section, a ditching plow having a pair of laterally spaced apart brackets, link means connecting each bracket with said upwardly extending frame section whereby said ditching plow is swingable relative to said ditcher frame, and means connected between the rear end portion of said upper rear frame section and certain of said link means for shifting said plow relative to said ditcher frame.

References Cited in the file of this patent
UNITED STATES PATENTS

| 1,864,639 | Crezee | June 28, 1932 |
| 2,678,596 | Todd | May 18, 1954 |
| 2,704,495 | Schwindt et al. | Mar. 22, 1955 |
| 2,729,156 | Willey | Jan. 3, 1956 |
| 2,841,067 | Magarian | July 1, 1958 |